United States Patent [19]
Gallagher

[11] Patent Number: 4,909,520
[45] Date of Patent: Mar. 20, 1990

[54] SEAL

[76] Inventor: Stephen F. Gallagher, 191 Parks St., Duxbury, Mass. 02332

[21] Appl. No.: 357,670

[22] Filed: May 26, 1989

Related U.S. Application Data

[63] Continuation of Ser. No. 41,719, Apr. 23, 1987, abandoned.

[51] Int. Cl.⁴ .................. F16J 9/20; F16J 9/28; F16J 15/02; F16L 21/02
[52] U.S. Cl. ...................... 277/177; 92/102; 92/249; 277/173; 277/207 A; 285/345; 285/910
[58] Field of Search ............. 277/177, 173, 168, 170, 277/171, 172, 216, 220, 117, 190, 221, 222, 207 A, 208–211; 285/231, 345, 230, 232, 95, 113, 910; 92/201, 203, 205, 206, 207, 249, 250

[56] References Cited

U.S. PATENT DOCUMENTS

| | | | |
|---|---|---|---|
| 1,300,623 | 4/1919 | Kistner | 277/216 X |
| 1,532,938 | 4/1925 | Peeler | 277/220 |
| 1,862,983 | 6/1932 | Roberts | 277/172 |
| 2,216,505 | 10/1940 | Thornhill | 277/173 X |
| 2,552,750 | 5/1951 | Thornhill | 277/171 X |
| 2,783,068 | 2/1957 | Bloom et al. | 277/177 |
| 2,935,349 | 5/1960 | Burch | 277/210 |
| 2,997,318 | 8/1961 | Lansky et al. | 277/210 |
| 3,037,830 | 6/1962 | Junod | 92/206 X |
| 3,214,182 | 10/1965 | Herbruggen | 277/215 X |
| 3,401,916 | 9/1968 | Scaramucci | 277/190 X |
| 3,472,523 | 10/1969 | Rentschler et al. | 277/209 |
| 3,473,814 | 10/1969 | Bastow | 277/176 X |
| 3,554,569 | 1/1971 | Gorman | 277/209 X |
| 3,576,329 | 4/1971 | Weaver | 285/231 X |
| 3,702,193 | 11/1972 | Flegel et al. | 277/209 |
| 3,797,835 | 3/1974 | Wehner | 277/171 X |
| 3,851,889 | 12/1974 | Nisper | 277/216 X |
| 3,909,016 | 9/1975 | Traub et al. | 277/176 X |
| 3,999,894 | 12/1976 | Nakayama et al. | 277/177 |
| 4,239,124 | 12/1980 | Inouye | 277/190 X |
| 4,342,463 | 8/1982 | Burke | 277/177 |
| 4,384,730 | 5/1983 | Diehl | 277/236 |
| 4,570,944 | 2/1986 | Traub | 277/176 X |

FOREIGN PATENT DOCUMENTS

| | | | |
|---|---|---|---|
| 1066067 | 9/1959 | Fed. Rep. of Germany | 277/170 |
| 2536631 | 2/1977 | Fed. Rep. of Germany | 277/207 A |
| 389281 | 12/1973 | U.S.S.R. | 277/216 |

*Primary Examiner*—Allan N. Shoap
*Attorney, Agent, or Firm*—Hill, Van Santen, Steadman & Simpson

[57] ABSTRACT

A shaft or piston seal for preventing unidirection fluid flow between two concentric mating members has an annular body in the form of a ring-like member with a polygonal profile in right cross section having innermost and outermost radial portions. One of the innermost and outermost radial portions at one end of the body defines a hinge surface and the other of the innermost and outermost radial portions at a medial section of said body defines a sealing surface. The other end of said body defines a non-contact stabilizing section. The sealing surface is in the form of a sealing band which contacts one of the mating members, the hinge surface seated in the other mating member. The non-contact stabilizing member flexes and provides a counterforce for urging the sealing band against the one mating member.

22 Claims, 3 Drawing Sheets

SEAL

This is a continuation, of application Ser. No. 041,719, filed Apr. 23, 1987, now abandoned.

BACKGROUND OF THE INVENTION

1. Field of Invention:

The invention relates to seals and, more particularly, is directed towards a seal for preventing fluid flow between two mating surfaces.

2. Description of the Prior Art:

A sealing line or seal band is an unbroken and continuous line or area of contact between a seal and its mating surfaces which effectively stops fluid migration from a pressurized space to one of lower pressure. Anything that interrupts the continuous and unbroken line or band will cause or increase leakage. Because the seal line must be continuous and unbroken, the ideal seal will tolerate a wide range of variables which affect that continuity. For many sealing applications where conditions of temperature, pressure, fluid, and geometry permit its use, the O-ring is often an excellent choice. Because of its round cross section, the O-ring readily conforms to common geometric shapes found in fluid power application, and quickly forms the seal line or band. However, O-rings suffer from the disadvantage that the flash point or a separation point on the mold from which the O-ring is made constitutes an imperfection which provides only a limited degree of sealing in certain instances. Another disadvantage is the necessity of providing a lead angle on the mating member to be sealed in order to prevent O-ring damage upon engagement or to reduce the engagement force encountered in assembly.

Lip seals or U-rings are widely used in both pneumatic and hydraulic applications. However, lip seals suffer from the disadvantage that they relax in a short period of time after installation. Although continued application of fluid pressure will resulting resealing of the lip seal, the initial application of fluid pressure will result in some leakage due to this relaxation or set.

A need has arisen for an improved seal having a cross-sectional profile which provides increased sealing characteristics while requiring less radial distance than prior art seals.

SUMMARY OF THE INVENTION

It is an object of the present invention to provide a seal which does not suffer from the heretofore mentioned disadvantages and limitations of existing seals.

It is another object of the present invention to provide a seal which flexes to make positive sealing contact. The seal made according to one embodiment of the present invention is configured to be seated in an annular groove formed about an interior circular opening in a fitting or fixture. The seal has an annular body defining a ring with an irregular polygonal profile in right cross section. The inlet end of the seal at its outermost surface has a flat hinge surface which sits in the groove. Two innermost radial surfaces of the seal at a medial portion thereof form a sealing surface with a leading edge. The locus of the leading edge defines an annular sealing band. The outlet or free end of the seal extends longitudinally beyond the leading edge of the sealing surface and defines a non-contact stabilizing section which flexes and provides a counterforce for urging the sealing band against a mating member inserted in the fitting or fixture. A small entry angle is formed between the inlet end and sealing band to facilitate insertion of the tubular member. The sealing band is longitudinally displaced from the end of the flat hinge surface nearest the outlet end a longitudinal distance which is one half the longitudinal distance between the inlet end of the flat hinge surface and the sealing band. The longitudinal distance between the inlet end of the hinge surface and the sealing band is equal to the radial distance between the hinge surface and the sealing band. The distance between the hinge surface and sealing band is greater than the depth of the groove so that the seal body flexes about the hinge surface and the sealing band presses against the tubular member when it is inserted into the inlet end of the fitting or fixture. Sealing against the tubular member increases as pressure is applied against the non-contact stabilizing section at the free end of the seal body.

It is a further object of the present invention to provide a piston seal which flexes to make positive sealing contact. The seal of the present invention is configured to fit in an annular groove formed in the exterior surface of a piston or like member. The seal has an annular body defining a ring with an irregular polygonal profile in right cross section. The leading end of the seal at its innermost radial surface has a flat hinge surface which sits in the groove. The outermost radial surfaces of the seal at a medial portion thereof intersect and form a sealing surface. The locus of the leading edge of the sealing surface defines an annular sealing band. The trailing or free end of the seal extends longitudinally beyond the sealing band surface and defines a non-contact stabilizing section which flexes and provides a counterforce for pressing the sealing band against a cylinder wall into which the piston is positioned. The sealing band is longitudinally displaced from the end of the flat hinge surface nearest the trailing end a longitudinal distance which is one half the longitudinal distance between the leading end of the flat hinge surface and the sealing band. The longitudinal distance between the leading end of the hinge surface and the sealing band is equal to the radial distance between the hinge surface and the sealing band. The distance between the hinge surface and sealing band is greater than the depth of the groove so that the seal body flexes about the hinge surface and the sealing band presses against the cylinder wall. Sealing against the cylindrical member increases as the piston moves and increased pressure is applied against the non-contact stabilizing section at the free end of the seal body. The sealing action is unidirectional and two seals or a composite seal is required to bidirectional sealing.

Other objects of the present invention will in part be obvious and will in part appear hereinafter.

The invention accordingly comprises the processes, together with their steps, elements and interrelationships, that are exemplified in the following disclosure, the scope of which will be indicated in the appended claims.

BRIEF DESCRIPTION OF THE DRAWINGS

A fuller understanding of the nature and objects of the present invention will become apparent upon consideration of the following detailed description taken in connection with the accompanying drawings, wherein.

DETAILED DESCRIPTION OF THE PREFERRED EMBODIMENTS

Figure 1:
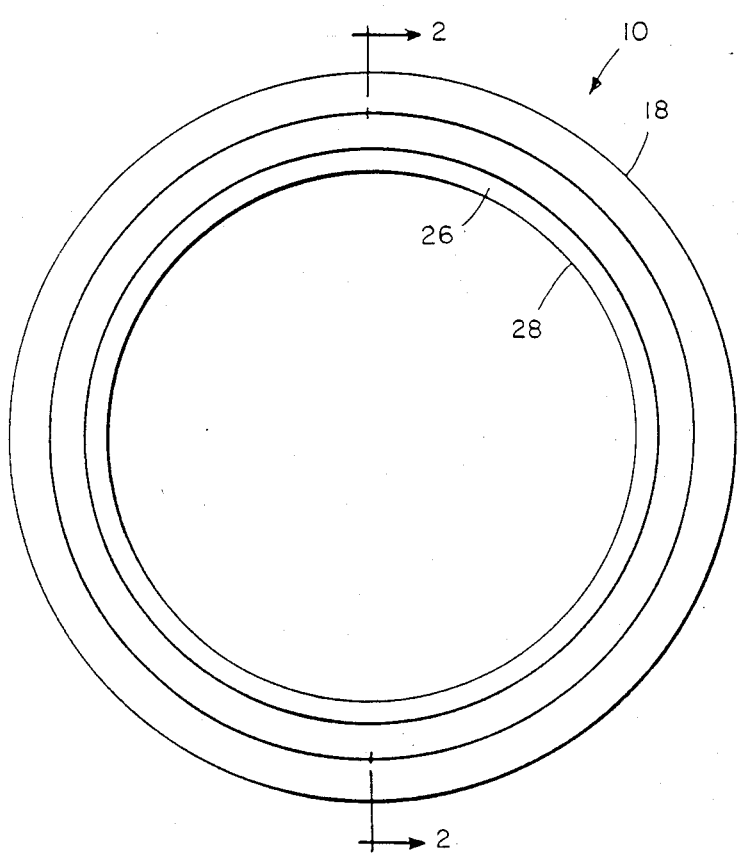
FIG. 1 is an end view of a seal embodying the invention.
Figure 2:
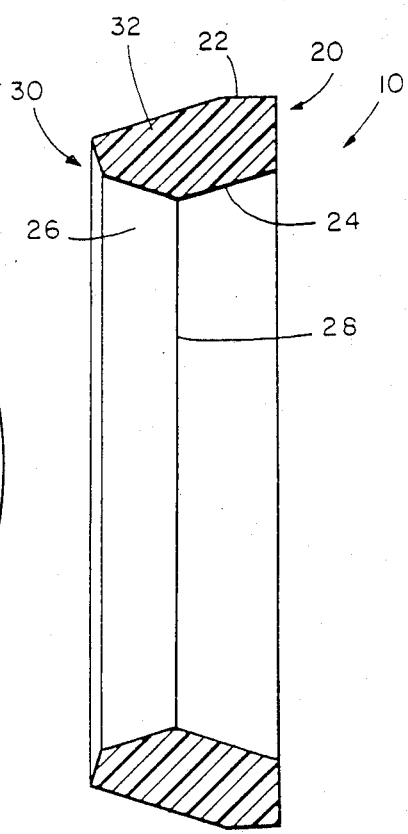
FIG. 2 is a sectional view of the seal taken along the line 2—2 in FIG. 1.
Figure 3:
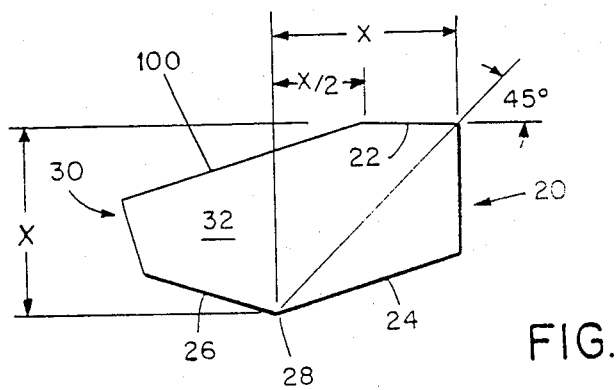
FIG. 3 is a schematic diagram illustrating certain principles of the invention.

Referring now to the drawings, particularly FIGS. 1 and 2, there is shown a seal 10 embodying the present invention. As shown in FIG. 2, seal 10 is composed of an elastomer, for example, and is configured to be seated in an annular groove 12 formed about an interior circular opening 14 in a fixture or fitting 16. Seal 10 has an annular body 18 defining a ring with an irregular polygonal profile in right cross section. In the preferred embodiment, the irregular polygonal profile is an irregular hexagonal profile. An inlet end 20 of the seal 10 at its outermost surface 22 defines a flat hinge surface which sits in groove 12, and its outer frusto-conical surface 100 intersects with surface 22. Innermost radial surfaces 24 and 26 of seal 10 at a medial portion thereof from a sealing surface at an apex 28. The locus of apex 28 defines an annular sealing band. An outlet end 30 or free end of the seal 10 extends longitudinally beyond the apex 28 and defines a non-contact stabilizing section 32 which flexes and provides a counterforce for urging the sealing band 28 against a mating member 34, for example a tubular member, which is inserted into fitting 16. A small entry angle in a range of 10° to 20°, preferably 17°, is formed between inlet end 20 and sealing band 28 to facilitate insertion of tubular member 34 into fitting 16. The entry angle is the angle presented by surface 24 to the end of the tubular member 34 which is inserted into fitting 16. The sealing band 28 is longitudinally displaced from the end of flat hinge surface 22 nearest the outlet end 30 a longitudinal distance which is one half the longitudinal distance between the inlet end 20 of the flat hinge surface and the sealing band. The sealing band apex 28 lies on a 45° line bisecting the angle between surface 22 and surface 26 as shown in FIG. 3. The longitudinal distance between the hinge surface 22 at the inlet end 20 and the sealing band 28 is equal to the radial distance between the hinge surface and the sealing band. The longitudinal length of non-contact stabilizing section 32 is approximately equal to the longitudinal distance between the inlet end 20 and the sealing band 28. As shown in FIG. 3, the radial distance between parallel line intersection the hinge surface 22 and the sealing band 28 is greater than the depth of groove 12 so that the body 18 of seal 10 flexes about the hinge surface and the sealing band 28 presses against tubular member 34 when it is inserted into an inlet end 35 of fitting 16. The sealing force exerted against tubular member 34 by sealing band 28 increases as pressure is applied against the non-contact stabilizing section 32 at the free end of body 18 of seal 10. The operating characteristics of seal 10 against tubular member 34 is best shown in FIGS. 4, 5 and 6.

Figure 4:
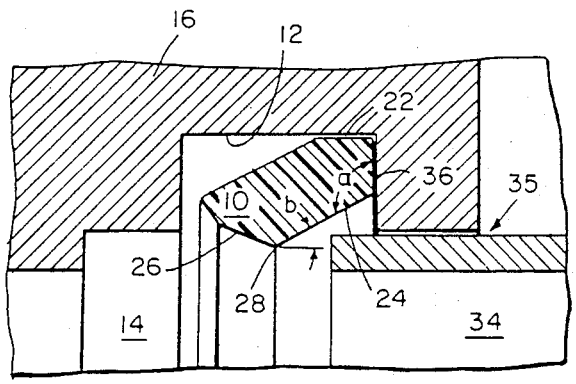
FIG. 4 is a schematic diagram showing the seal of FIG. 1 in place in a fitting.
Figure 5:
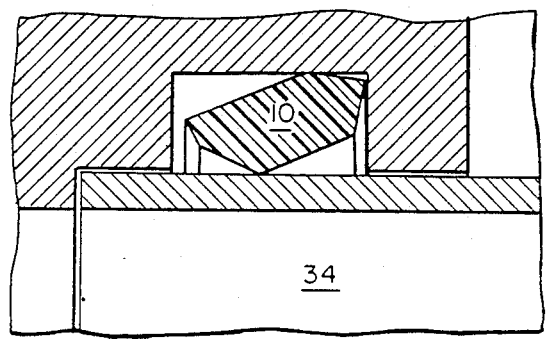
FIG. 5 is a schematic diagram showing the seal of FIG. 4 flexed by insertion of a tubular member.

FIG. 4 shows seal 10 seated in groove 12, the hinged surface 22 resting on the bottom of the groove. An inlet surface 36 of seal 10 lies in a plane which is substantially perpendicular to the plane of hinged surface 22. Surface 36 abuts the sidewall of groove 12 adjacent the inlet end 35 of fitting 16. The plane of surface 24 intersects with the plane of surface 36 and forms an angle in the range of 100°–110° as denoted by the reference character a. That is, as previously indicated, surface 24 forms an entry angle for tubular member 34 in the range of 10° to 20°, preferably 17°. The angle is denoted by reference character b. Sealing band 28 is sized to snugly fit within opening 14 formed in fitting 16. Sealing band 28 extends radially beyond the sidewalls of groove 12 a sufficient distance so that when tubular member 34 is inserted into the opening 14, sealing band is urged inwardly into groove 12 about hinged surface 24. The non-contact stabilizing section 32 flexes as the sealing band 28 is urged inwardly into groove 12 as shown in FIG. 5. The sealing band 28 is in sealing contact with tubular member 34.

Figure 6:
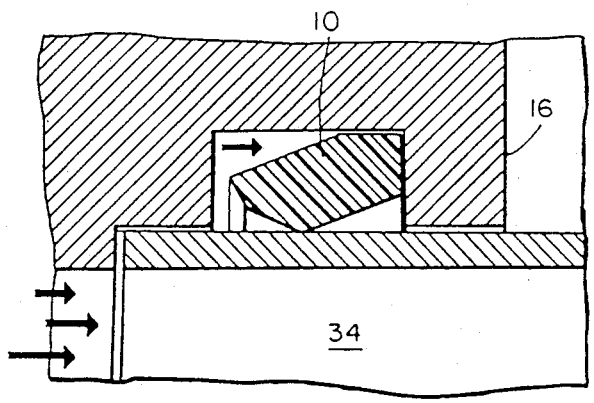
FIG. 6 is a schematic diagram showing pressure applied to the fitting.

As shown in FIG. 6, when a pressurized fluid is fed through fitting 16 and tubular member 34 from the direction shown by the arrows, pressure is applied against the non-contact stabilizing section 32 and sealing band 28 is urged against tubular member 34, thereby increasing the sealing effectiveness of seal 10.

From the foregoing, it will be readily appreciated that seal 10 is a unidirectional seal. That is, seal 10 does not provide an effective seal if pressure is applied from the right-hand side of FIG. 6 rather than from the left-side as shown. Bidirectional sealing is provided by use of two seals 40 and 42, for example piston seals, as shown in FIG. 7.

Figure 7:
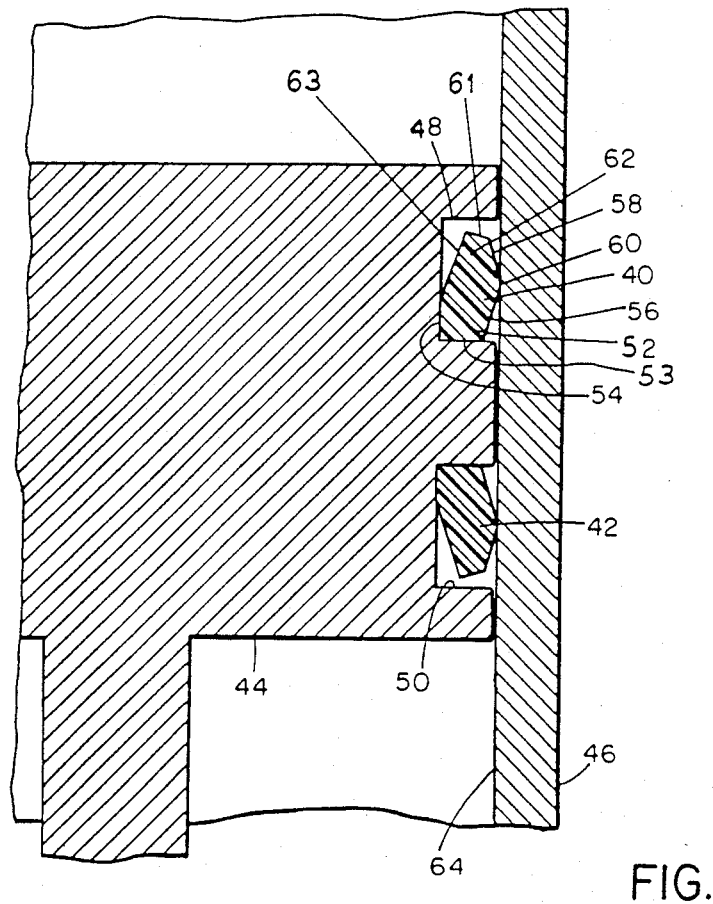
FIG. 7 is a sectional view showing use of a pair of seals in a piston.

FIG. 7 shows a sectional view of a piston 44 within a cylinder 46. Seal 40 is configured to fit in an annular groove 48 which is formed in the exterior surface of piston 44. Similarly, seal 42 is configured to fit in an annular groove 50 formed in the exterior surface of piston 44. Grooves 48 and 50 are disposed in spaced parallel relationship to one another and lie in a plane which is perpendicular to the longitudinal axis of the piston 44. Seal 40 has an annular body 52 defining a ring with an irregular polygonal profile in right cross section. In the illustrated embodiment, the polygonal profile of annular body 52 is an irregular hexagonal profile. The leading end 53 of seal 40 at its innermost radial surface has a flat hinge surface 54 which sits in groove 48 and also a frusto-conical surface 63. The outermost radial surfaces 56 and 58 of seal 40 at the medial portion thereof intersect and form a sealing apex 60. The locus of the sealing apex 60 defines an annular sealing band. The trailing or free end 61 of seal 40 extends longitudinally beyond sealing band 60 and defines a non-contact stabilizing section 62 which flexes and provides a counterforce for pressing the sealing band against a wall 64 of the cylinder 46. Sealing band 60 is longitudinally displaced from the end of the flat hinge surface 54 nearest the trailing end 61 a longitudinal distance which is one half the longitudinal distance between the flat hinge surface at the leading edge 53 and the sealing band. The longitudinal distance between the hinge surface 54 at the leading edge 53 and the sealing band 60 is equal to the radial distance between the hinge surface and the sealing band. The longitudinal length of non-contact section 62 is approximately equal to the longitudinal distance between the leading edge 53 and the sealing band 60. The distance between hinge surface 54 and sealing band 60 is greater than the depth of the groove 48 so that the non-contact stabilizing section 62 flexes about the hinge surface and the sealing band 60 presses against the cylinder wall 64. Sealing against the cylinder wall increases as piston 44 moves and increased pressure is applied against non-contact stabilizing section 62 at the free end of the seal body 52. Seal 42 is identical to seal 40 with the exception of that it is a mirror image thereof. That is, seal 42 provides sealing when the piston is moved upwardly and seal 40 provides sealing when piston 44 moves downwardly. It will be readily appreciated that the seal embodying the present invention provides the sealing unidirectional sealing and two seals are required for bidirectional sealing.

Figure 8:
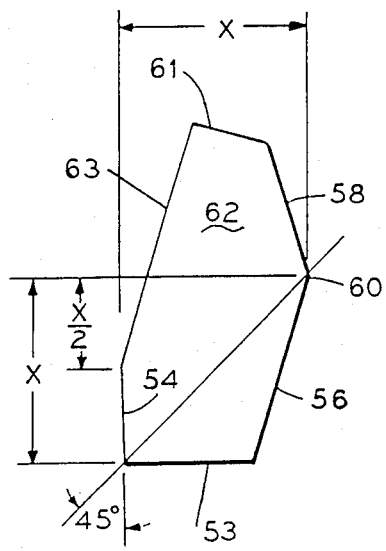
FIG. 8 is a schematic diagram like FIG. 3 but showing the embodiment of the seal shown in FIG. 7 wherein the outer peripheral surfaces on FIG. 3 are inner peripheral surfaces, and the inner peripheral surfaces shown in FIG. 3 are outer peripheral surfaces of the seal.

FIG. 8 is a view analogous to FIG. 3, but for the embodiment of the sealing band shown in FIG. 7 wherein the outer peripheral surfaces of FIG. 3 become the inner peripheral surfaces in FIG. 8 and the inner peripheral surfaces in FIG. 3 become the outer peripheral surfaces in FIG. 8. Specifically, in FIG. 8 the outer peripheral surfaces are 56 and 58 and the sealing band 60 is at the intersection of these outer peripheral surfaces 56 and 58. The inner peripheral surfaces are 54 and 63.

The sealing band 60 also lies on a 45° line bisecting the angle between surfaces 53 and 54 as shown in FIG. 8.

Since certain changes may be made in the foregoing disclosure without departing from the scope of the invention herein involved, it is intended that all matter contained in the above description and depicted in the accompanying drawings be construed in an illustrative sense and not in a limited manner.

What is claimed is:

1. A seal for placement in a groove between concentric portions of structures requiring a sealing therebetween to restrict passage of fluid under pressure, said groove having a given radial depth and having a planar side-wall perpendicular to a cylindrical bottom surface, comprising:
   a ring-like annular body with a central longitudinal axis and a polygonal cross-section defined by a first axial end, a second axial end, and a pair of inner and a pair of outer peripheral surfaces between the ends, the second axial end having a smaller outer diameter than that of the first axial end;
   said first axial end comprising a planar first surface perpendicular to said longitudinal axis and adapted to engage the planar side wall of the groove, said planar side wall also being perpendicular to said longitudinal axis;
   said outer peripheral surfaces comprising a cylindrical second surface substantially perpendicular to said planar first surface, and a substantially frusto-conical third surface intersecting the second surface and having a radius which decreases in a direction towards said second axial end;
   said inner peripheral surfaces comprising substantially frusto-conical fourth and fifth surfaces intersecting with one another, said fourth surface extending from said first surface and said fifth surface extending from said fourth surface to said second end, the fourth surface having a radius which decreases and the fifth surface having a radius which increases relative to said central longitudinal axis in a direction from the first axial end to the second axial end of the body, and at an intersection of the fourth and fifth surfaces a peripheral sealing band being formed;
   a distance measured along a radius of said seal being defined between two parallel lines each parallel to said longitudinal axis, one of the parallel lines intersecting the second surface and the other intersecting the sealing band, and wherein said distance is greater than the given radial depth of the groove; and
   the sealing band being positioned in a direction along the longitudinal axis such that it lies axially between the intersection of the second and third surfaces and the second axial end, said third and fifth surfaces being dimensioned to be spaced from the concentric portions of the structures while a sealing is maintained with the concentric portions by the sealing band and at least a portion of said second surface.

2. A seal according to claim 1 wherein the second axial end has a sixth planar surface located thereat, ends of which are intersected by the third and fifth surfaces.

3. A seal according to claim 2 wherein the sixth surface is frusto-conical, and the intersection between the third and sixth surfaces defines a maximum thickness of the body along the longitudinal axis from the first to the second axial ends.

4. A seal according to claim 1 wherein the sealing band lies approximately on a 45° plane bisecting an angle between the first surface and the second surface.

5. A seal according to claim 1 wherein the intersection between the second and third surface lies in the direction along the longitudinal axis approximately half-way between the sealing band and the first surface.

6. A seal according to claim 1 wherein a distance in the direction along the longitudinal axis from the first surface to the sealing band is substantially a same distance from the second surface to the sealing band running in a direction perpendicular to the longitudinal axis.

7. A seal according to claim 1 wherein an entry angle defined by the fourth surface relative to a line parallel to the second surface lies in a range from 10 to 20°.

8. A seal according to claim 7 wherein the entry angle is approximately 17°.

9. A seal according to claim 1 wherein an angle between the first surface and the fourth surface lies in a range from 100° to 110°.

10. A seal according to claim 1 wherein the annular body is comprised of an elastomer.

11. A sealing system, comprising:
    first and second structures having concentric portions with a groove in one of said structures and requiring a sealing therebetween to restrict passage of fluid under pressure, said groove having a given radial depth and having a planar side wall perpendicular to a cylindrical bottom surface;
    a ring-like annular body with a central longitudinal axis and a polygonal cross-section defined by a first axial end, a second axial end, and a pair of inner and a pair of outer peripheral surfaces between the ends, the second axial end having a smaller outer diameter than that of the first axial end;
    said first axial end comprising a planar first surface perpendicular to said longitudinal axis and adapted to engage the planar side wall of the groove, said planar side wall also being perpendicular to said longitudinal axis;

said outer peripheral surfaces comprising a cylindrical second surface substantially perpendicular to said planar first surface, and a substantially frusto-conical third surface intersecting the second surface and having a radius which decreases in a direction towards said second axial end;

said inner peripheral surfaces comprising substantially frusto-conical fourth and fifth surfaces intersecting with one another, said fourth surface extending from said first surface and said fifth surface extending from said fourth surface to said second end, the fourth surface having a radius which decreases and the fifth surface having a radius which increases relative to said central longitudinal axis in a direction from the first axial end to the second axial end of the body, and at an intersection of the fourth and fifth surfaces a peripheral sealing band being formed;

a distance measured along a radius of said seal being defined between two parallel lines each parallel to said longitudinal axis, one of the parallel lines intersecting the second surface and the other intersecting the sealing band, and wherein said distance is greater than the given radial depth of the groove; and the sealing band being positioned in a direction along the longitudinal axis such that it lies axially between the intersection of the second and third surfaces and the second axial end, said third and fifth surfaces being dimensioned to be spaced from the concentric portions of the structures while a sealing is maintained with the concentric portions by the sealing band and at least a portion of said second surface.

12. A seal for placement in a groove between concentric portions of structures requiring a sealing therebetween to restrict passage of fluid under pressure, said groove having a given radial depth and having a planar side wall perpendicular to a cylindrical bottom surface, comprising:

a ring-like annular body with a central longitudinal axis and a polygonal cross-section defined by a first axial end, a second axial end, and a pair of inner and a pair of outer peripheral surfaces between the ends, the second axial end having a larger inner diameter than that of the first axial end;

said first axial end comprising a planar first surface perpendicular to said longitudinal axis and adapted to engage the planar side wall of the groove, said planar side wall also being perpendicular to said longitudinal axis;

said inner peripheral surfaces comprising a cylindrical second surface substantially perpendicular to said planar first surface, and a substantially frusto-conical third surface intersecting the second surface and having a radius which increases in a direction towards said second axial end;

said outer peripheral surfaces comprising substantially frusto-conical fourth and fifth surfaces intersecting with one another, said fourth surface extending from said first surface and said fifth surface extending from said fourth surface to said second end, the fourth surface having a radius which increases and the fifth surface having a radius which decreases relative to said central longitudinal axis in a direction from the first axial end to the second axial end of the body, and at an intersection of the fourth and fifth surfaces an inner peripheral sealing band being formed;

a distance measured along a radius of said seal being defined between two parallel lines each parallel to said longitudinal axis, one of the parallel lines intersecting the second surface and the other intersecting the sealing band, and wherein said distance is greater than the given radial depth of the groove; and the sealing band being positioned in a direction along the longitudinal axis such that it lies axially between the intersection of the second and third surfaces and the second axial end, said third and fifth surfaces being dimensioned to be spaced from the concentric portions of the structures while a sealing is maintained with the concentric portions by the sealing band and at least a portion of said second surface.

13. A seal according to claim 12 wherein the second axial end has a sixth planar surface located thereat, ends of which are intersected by the third and fifth surfaces.

14. A seal according to claim 13 wherein the sixth surface is frusto-conical, and the intersection between the third and sixth surfaces defines a maximum thickness of the body along the longitudinal axis from the first to the second axial ends.

15. A seal according to claim 13 wherein the sealing band lies approximately on a 45° plane bisecting an angle between the first surface and the second surface.

16. A seal according to claim 13 wherein the intersection between the second and third surface lies in the direction along the longitudinal axis approximately half-way between the sealing band and the first surface.

17. A seal according to claim 13 wherein a distance in the direction along the longitudinal axis from the first surface to the sealing band is substantially a same distance from the second surface to the sealing band running in a direction perpendicular to the longitudinal axis.

18. A seal according to claim 13 wherein an entry angle defined by the fourth surface relative to a line parallel to the second surface lies in a range from 10° to 20°.

19. A seal according to claim 18 wherein the entry angle is approximately 17°.

20. A seal according to claim 12 wherein an angle between the first surface and the fourth surface lies in a range from 100° to 110°.

21. A seal according to claim 12 wherein the annular body is comprised of an elastomer.

22. A sealing system, comprising:

first and second structures having concentric portions with a groove in one of said structures and requiring a sealing therebetween to restrict passage of fluid under pressure, said groove having a given radial depth and having a planar side wall perpendicular to a cylindrical bottom surface;

a ring-like annular body with a central longitudinal axis and a polygonal cross-section defined by a first axial end, a second axial end, and a pair of inner and a pair of outer peripheral surfaces between the ends, the second axial end having a larger inner diameter than that of the first axial end;

said first axial end comprising a planar first surface perpendicular to said longitudinal axis and adapted to engage the planar side wall of the groove, said planar side wall also being perpendicular to said longitudinal axis;

said inner peripheral surfaces comprising a cylindrical second surface substantially perpendicular to said planar first surface, and a substantially frusto-conical third surface intersecting the second surface and having a radius which increases in a direction towards said second axial end;

said outer peripheral surfaces comprising substantially frusto-conical fourth and fifth surfaces intersecting with one another, said fourth surface extending from said first surface and said fifth surface extending from said fourth surface to said second end, the fourth surface having a radius which increases and the fifth surface having a radius which decreases relative to said central longitudinal axis in a direction from the first axial end to the second axial end of the body, and at an intersection of the fourth and fifth surfaces an inner peripheral sealing band being formed;

a distance measured along a radius of said seal being defined between two parallel lines each parallel to said longitudinal axis, one of the parallel lines intersecting the second surface and the other intersecting the sealing band, and wherein said distance is greater than the given radial depth of the groove; and the sealing band being positioned in a direction along the longitudinal axis such that it lies axially between the intersection of the second and third surfaces and the second axial end, said third and fifth surfaces being dimensioned to be spaced from the concentric portions of the structures while a sealing is maintained with the concentric portions by the sealing band ad at least a portion of said second surface.

* * * * *